United States Patent
Paramasivam et al.

(10) Patent No.: US 10,804,512 B2
(45) Date of Patent: Oct. 13, 2020

(54) COMPRESSION LIMITERS FOR ELECTRIFIED VEHICLE BATTERY ASSEMBLIES

(71) Applicant: FORD GLOBAL TECHNOLOGIES, LLC, Dearborn, MI (US)

(72) Inventors: Saravanan Paramasivam, South Lyon, MI (US); Rajaram Subramanian, Ann Arbor, MI (US); Dave Moschet, Dearborn, MI (US); Tom M. Gunther, Canton, MI (US); Kanchana Perumalla, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/980,128

(22) Filed: May 15, 2018

(65) Prior Publication Data
US 2018/0261812 A1 Sep. 13, 2018

Related U.S. Application Data

(63) Continuation of application No. 14/643,294, filed on Mar. 10, 2015, now Pat. No. 10,003,052.

(51) Int. Cl.
*H01M 2/10* (2006.01)
*B60K 1/00* (2006.01)

(52) U.S. Cl.
CPC ............ *H01M 2/1083* (2013.01); *B60K 1/00* (2013.01); *H01M 2/1077* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2005/0058891 A1* | 3/2005 | Marraffa | H01M 2/1077 429/99 |
| 2012/0107659 A1* | 5/2012 | Phlegm | H01M 10/0413 429/98 |
| 2012/0321934 A1 | 12/2012 | Hopkins et al. | |
| 2013/0164577 A1* | 6/2013 | Insana | H01M 2/1077 429/72 |

FOREIGN PATENT DOCUMENTS

| | | |
|---|---|---|
| CN | 103262292 A | 8/2013 |
| DE | 102012224041 A1 | 6/2013 |

* cited by examiner

*Primary Examiner* — Daniel S Gatewood
(74) *Attorney, Agent, or Firm* — David B. Kelley; Carlson, Gaskey & Olds

(57) ABSTRACT

This disclosure details battery assemblies for electrified vehicles. An exemplary battery assembly may employ one or more compression limiters that maintain the integrity and positioning of a plurality of battery arrays housed inside the battery assembly. The compression limiters may include a body and an attachment head near an end of the body. The attachment head is configured to engage a portion of a support structure of a battery array.

18 Claims, 5 Drawing Sheets

COMPRESSION LIMITERS FOR ELECTRIFIED VEHICLE BATTERY ASSEMBLIES

CROSS-REFERENCE TO RELATED APPLICATION

This is a continuation of U.S. patent application Ser. No. 14/643,294, filed Mar. 10, 2015, the entire disclosure of which is incorporated herein by reference.

TECHNICAL FIELD

This disclosure relates to a battery assembly for an electrified vehicle. The battery assembly includes one or more compression limiters configured to engage a structural member of the battery assembly. The compression limiters carry loads within the battery assembly and guide fasteners for mating parts of the assembly.

BACKGROUND

The need to reduce automotive fuel consumption and emissions is well known. Therefore, vehicles are being developed that either reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

The powertrain of an electrified vehicle is typically equipped with a battery assembly have a plurality of battery cells that store electric power for powering the electric machines and other electric loads of the electrified vehicle. A support structure (i.e., end walls, side walls, etc.) generally surrounds the battery cells to build a battery array. The battery assembly can include multiple battery arrays housed within an enclosure assembly. The battery arrays may need secured relative to one another and relative to the enclosure assembly.

SUMMARY

A battery assembly according to an exemplary aspect of the present disclosure includes, among other things, a compression limiter including a body and an attachment head near a first end of the body and configured to engage a structural member of the battery assembly.

In a further non-limiting embodiment of the foregoing assembly, the body extends between the first end and a second end and is conical-shaped.

In a further non-limiting embodiment of either of the foregoing assemblies, the body tapers in a direction from the first end toward the second end.

In a further non-limiting embodiment of any of the foregoing assemblies, the attachment head includes a flange and an arm spaced from the flange.

In a further non-limiting embodiment of any of the foregoing assemblies, the arm extends along a transverse angle from the body toward the flange.

In a further non-limiting embodiment of any of the foregoing assemblies, a recess is formed between the flange and the arm.

In a further non-limiting embodiment of any of the foregoing assemblies, the recess extends between an underside of the flange and the arm.

In a further non-limiting embodiment of any of the foregoing assemblies, a passage is formed through the body and configured to receive a fastener.

In a further non-limiting embodiment of any of the foregoing assemblies, the compression limiter is axially disposed between a first battery array and a second battery array.

In a further non-limiting embodiment of any of the foregoing assemblies, the structural member is an extension of a side wall of a battery array of the battery assembly.

In a further non-limiting embodiment of any of the foregoing assemblies, the extension extends above a top surface of a battery cell of the battery array.

In a further non-limiting embodiment of any of the foregoing assemblies, the compression limiter extends toward a tray of the battery assembly.

A battery assembly according to another exemplary aspect of the present disclosure includes, among other things, a plurality of battery cells, a support structure extending about the plurality of battery cells and a compression limiter configured to engage a portion of the support structure.

In a further non-limiting embodiment of the foregoing assembly, the portion is a side wall of the support structure.

In a further non-limiting embodiment of either of the foregoing assemblies, the side wall includes an extension that extends above a top surface of the plurality of battery cells.

In a further non-limiting embodiment of any of the foregoing assemblies, the compression limiter includes a body and an attachment head near a first end of the body.

In a further non-limiting embodiment of any of the foregoing assemblies, the attachment head includes a flange and at least two arms that are spaced from the flange.

In a further non-limiting embodiment of any of the foregoing assemblies, a recess is formed between the flange and one of the at least two arms, the portion of the support structure extending into the recess.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a battery assembly for an electrified vehicle. The battery assembly may employ one or more compression limiters that maintain the integrity and positioning of a plurality of battery arrays housed inside the battery assembly. The compression limiters include a body and an attachment head near an end of the body. The attachment head is configured to engage a portion of a support structure of a battery array. In one embodiment, the attachment head engages a side wall of the support structure. The compression limiters guide fasteners to a mounting location at a tray of the battery assembly using a "top-down" attachment technique. The compression limiters of this disclosure improve access to tight spaces inside the battery assembly and simplify assembly and handling of the battery assembly. These and other features are discussed in greater detail in the following paragraphs of this detailed description.

Figure 1:
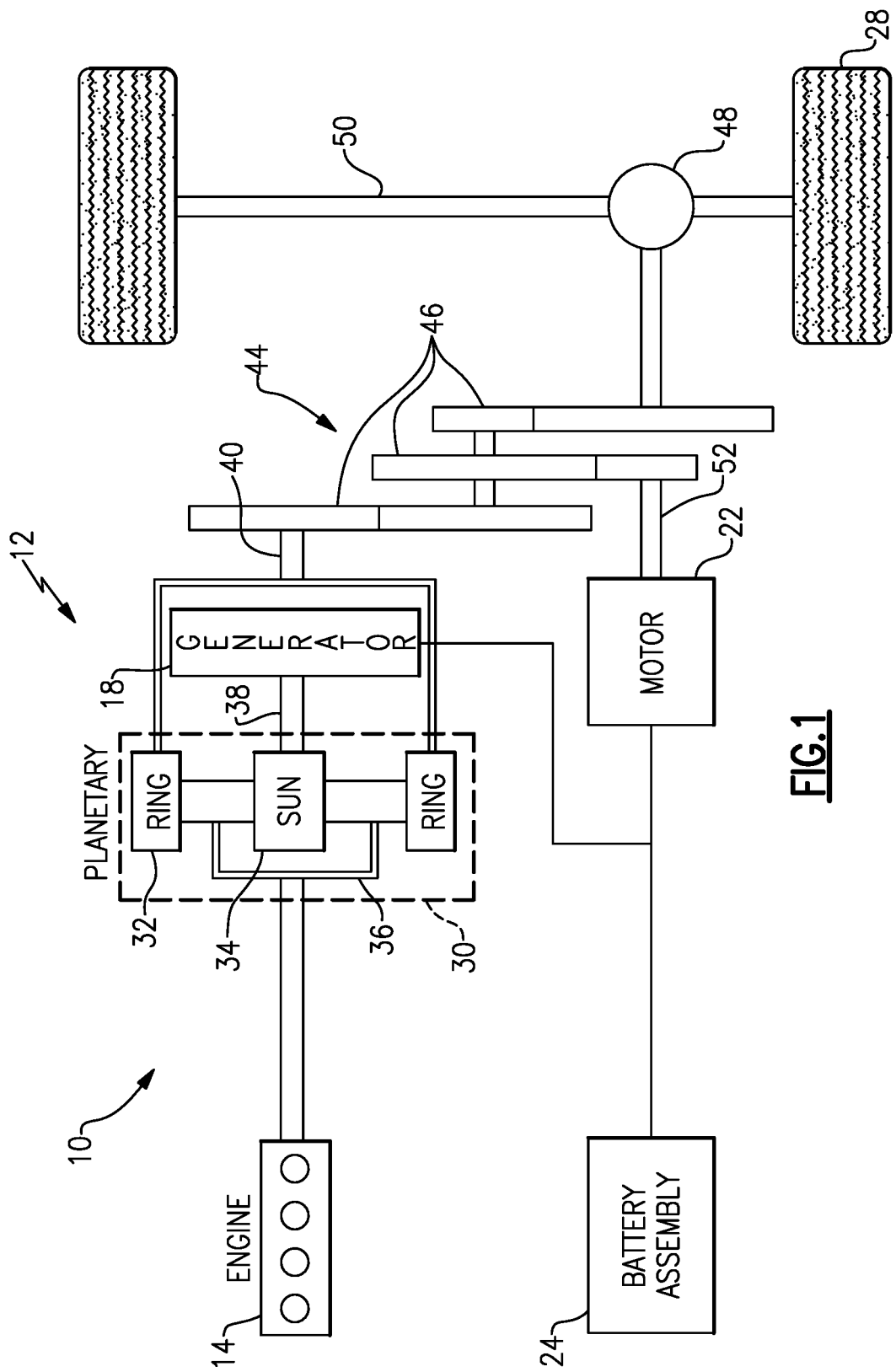
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may include a high voltage traction battery pack that includes a plurality of battery arrays capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion. The electrified vehicle 12 may be operated in other operating modes in addition to the EV and HEV modes within the scope of this disclosure.

Figure 2:
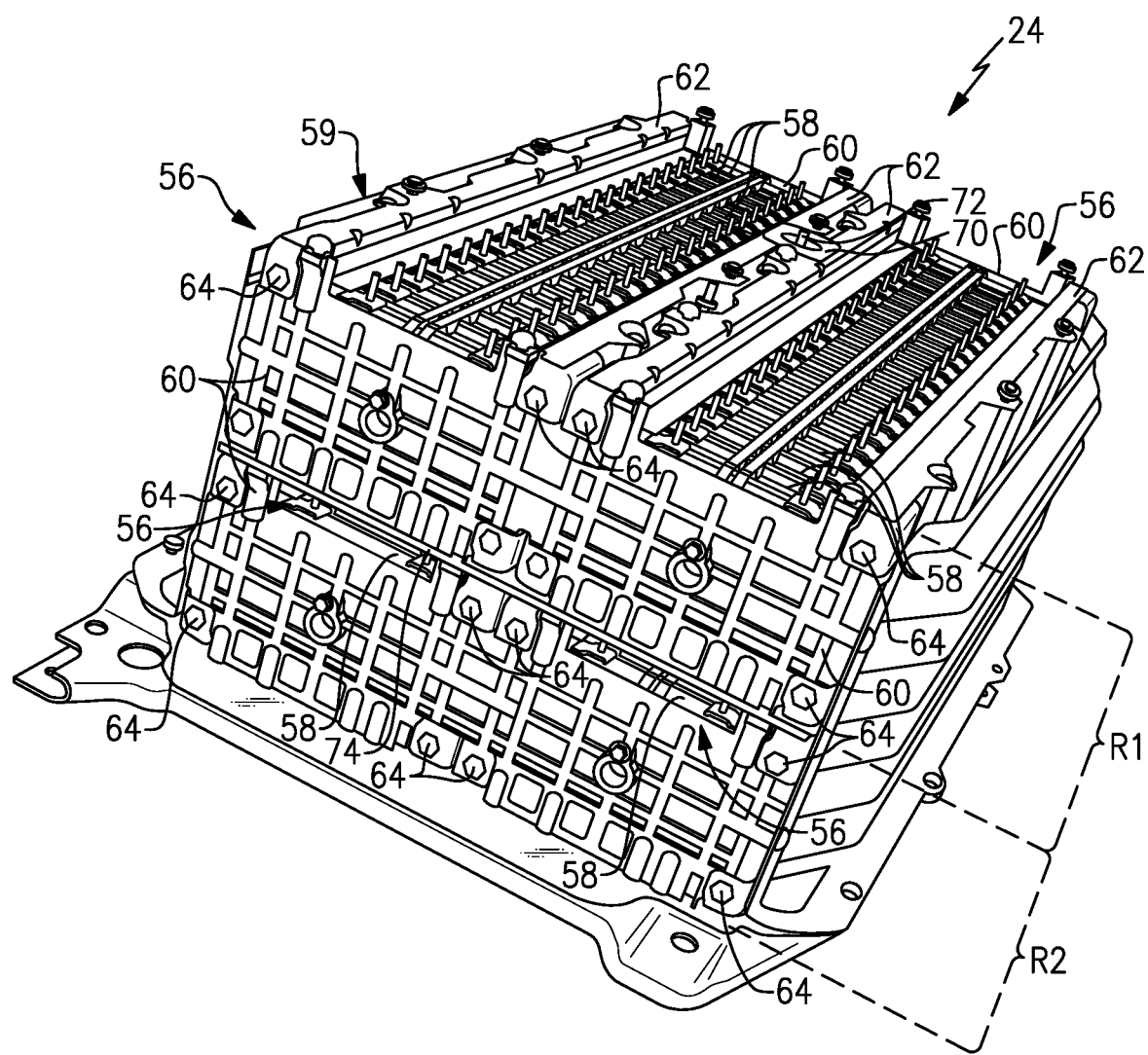
FIG. 2 illustrates a battery assembly of an electrified vehicle.
Figure 3:
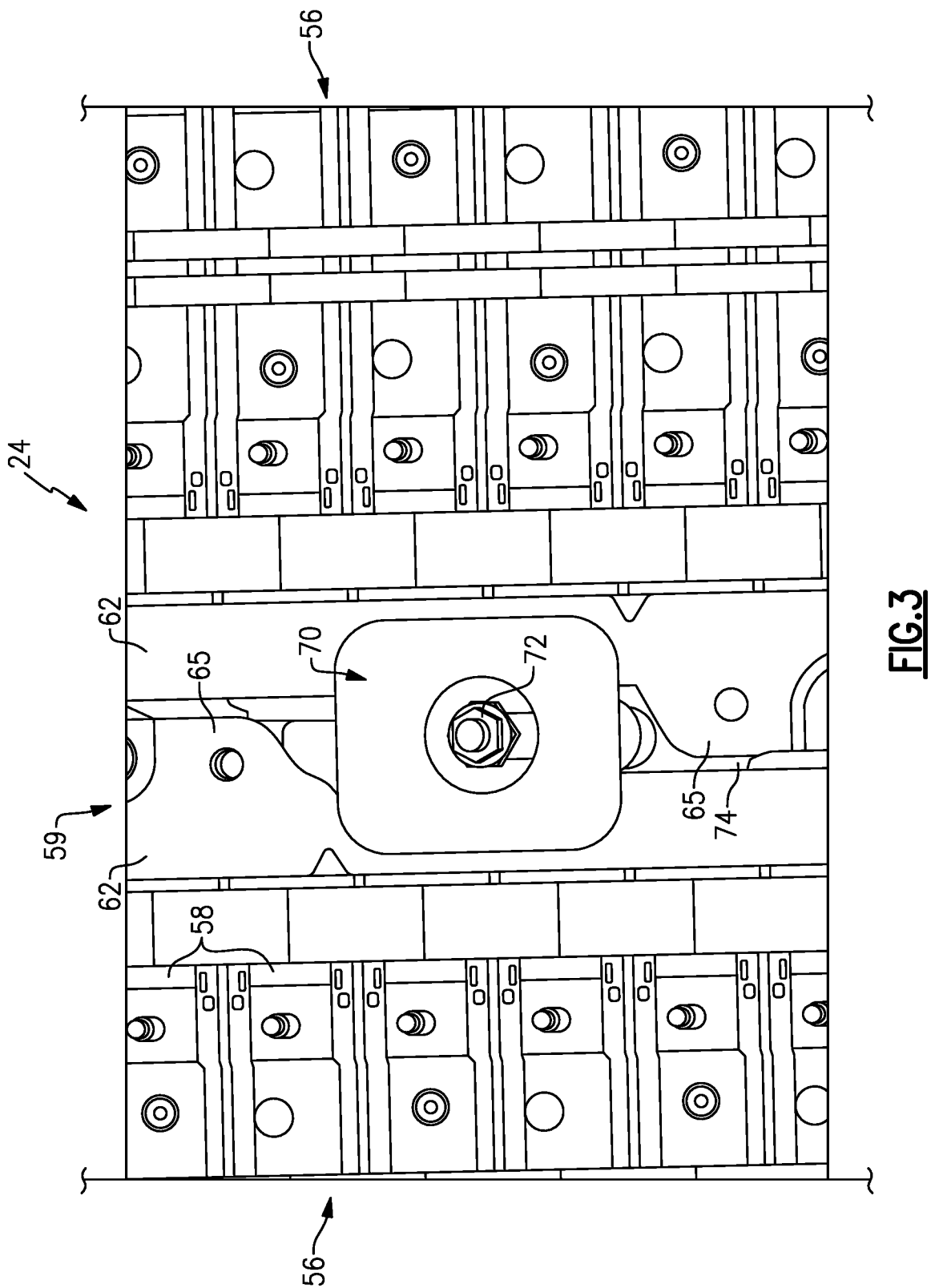
FIG. 3 is a top view of a portion of the battery assembly of FIG. 2.
Figure 4:
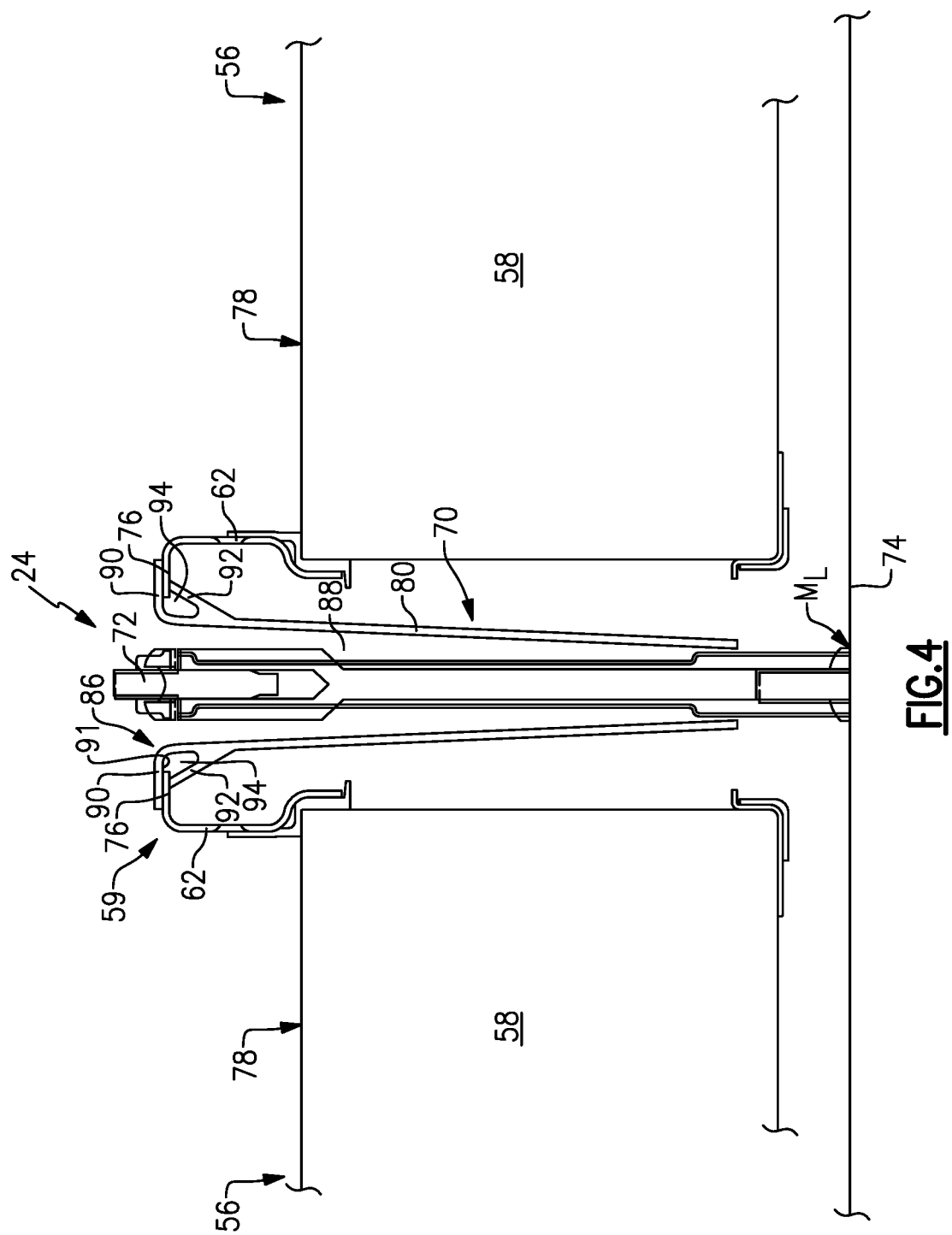
FIG. 4 is a cross-sectional view through a portion of the battery assembly of FIG. 2.

FIGS. 2, 3 and 4 illustrate a battery assembly 24 that can be incorporated into an electrified vehicle. For example, the battery assembly 24 could be employed within the electrified vehicle 12 of FIG. 1. The battery assembly 24 includes multiple battery arrays 56 (i.e., groupings of battery cells) for supplying electrical power to various components of the electrified vehicle 12. Although a total of four battery arrays 56 are illustrated in FIG. 2, the battery assembly 24 could include a greater or fewer number of battery arrays within the scope of this disclosure. In other words, this disclosure is not limited to the specific configuration shown in FIG. 2.

A plurality of battery cells 58 may be stacked side-by-side along a span length of each battery array 56. Although not specifically shown, the battery cells 58 may be electrically connected to one another using bus bar assemblies. In one embodiment, the battery cells 58 are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

A support structure 59 surrounds the battery cells 58 of each battery array 56. The support structure 59 may include opposing end walls 60 and opposing side walls 62 which cooperate to hold the battery cells 58 under compression relative to one another along their lengths and widths. In one embodiment, the side walls 62 of each support structure 59 are connected to the end wall 60 using one or more fasteners 64 to build each battery array 56.

The battery assembly 24 may additionally employ one or more compression limiters 70 disposed between adjacent battery arrays 56. In one embodiment, the compression limiters 70 are positioned between the side walls 62 of adjacent battery arrays 56 of a top row R1 of the battery assembly 24. In another embodiment, the compression limiters 70 are positioned axially between tabs 65 which extend from the side walls 62 of the adjacent battery arrays 56 of the top row R1 (best shown in FIG. 3). Other mounting locations could also be suitable for the compression limiters 70.

The compression limiters 70 are adapted to guide a fastener 72 to a mounting location at a tray 74 of the battery assembly 24. In one non-limiting embodiment, the tray 74 is located between the top row R1 and a bottom row R2 of battery arrays 56 of the battery assembly 24 (best shown in FIG. 2). The tray 74 could alternatively be located beneath the bottom row R2. The fasteners 72 are secured to the tray 74 to maintain a positioning of the battery arrays 56 inside the battery assembly 24. The fasteners 72 also impart a compressive load against the battery arrays 56 to hold the battery arrays 56 under compression against cooling elements, such as a cold plate (not shown), that are designed to maintain the battery cells 58 within a desired temperature range. The compression limiters 70 are configured to withstand the compressive loads imparted during assembly and operation of the battery arrays 56.

The compression limiters 70 are further configured to engage a portion of the support structures 59 of each battery array 56. For example, in one non-limiting embodiment, the compression limiters 70 receive an extension 76, which may be configured as a flange, of the side walls 62 of the support structures 59 to connect the compression limiter 70 to each battery array 56. The extension 76 may extend above a top surface 78 of the battery cells 58 (see FIG. 4) such that the compression limiters 70 engage the battery arrays 56 at a location above the top surfaces 78. This "top down" attachment technique is designed to ease assembly of the battery assembly 24 by reducing the need to access tight spaces inside the battery assembly 24 in order to fixate the compression limiters 70 and the fasteners 72.

Figure 5:
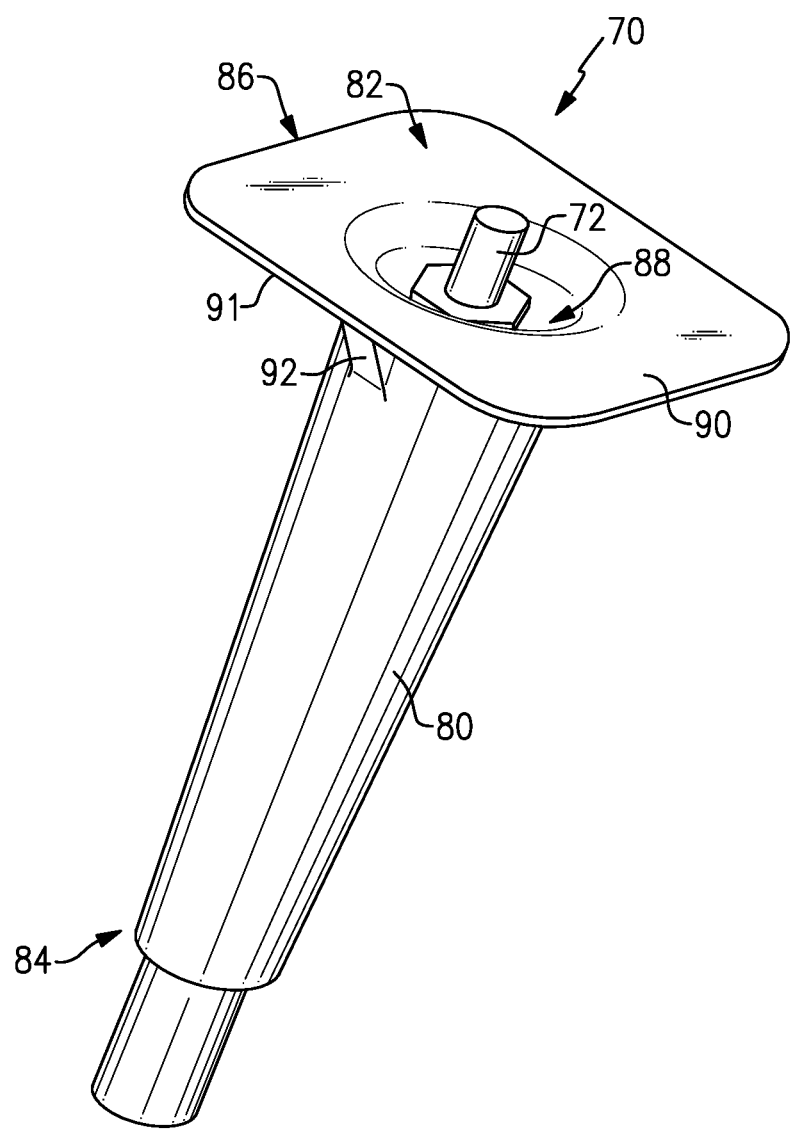
FIG. 5 illustrates a compression limiter of a battery assembly.

FIG. 5, with continued reference to FIG. 4, illustrates an exemplary compression limiter 70. The compression limiter 70 includes a body 80 extending between a first end 82 and a second end 84. An attachment head 86 is located near the first end 82 of the body 80. In one embodiment, the body 80 is conical-shaped and may taper in a direction from the first end 82 toward the second end 84. The body 80 includes a passage 88 for accommodating the fastener 72. The passage 88 guides the fastener 72 to a mounting location ML at the tray 74 of the battery assembly 24 (see FIG. 4).

In one embodiment, the attachment head 86 includes a flange 90 that extends outwardly from the body 80. In one embodiment, the flange 90 extends perpendicularly to the body 80. The passage 88 of the body 80 opens through the flange 90 of the attachment head 86.

One or more arms 92 may also extend from the body 80. Two or more arms 92 may be provided. The arms 92 are disposed at a portion of the body 80 that is between the flange 90 and the second end 84. The arms 92 may extend at a transverse angle toward an underside 91 of the flange 90. The actual angle at which the arms 92 extend may vary depending on the structural member the attachment head 86 is designed to receive, among other factors.

A recess 94 extends between the flange 90 and each arm 92 and is sized and shaped to receive the extension 76 of the side wall 62 of the support structure 59 (see FIG. 4). The extension 76 is therefore received between the flange 90 and one of the arms 92. In this way, the attachment head 86 is configured to engage a structural member (here, a portion of the side wall 62) of the battery assembly 24 to secure the compression limiter 70 in place within the battery assembly 24.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising;
    a tray;
    a first battery array and a second battery array positioned against the tray;
    a compression limiter axially disposed between the first battery array and the second battery array and extending in a direction toward the tray, wherein the compression limiter contacts each of the first battery array and the second battery array; and
    a fastener inserted vertically through a passage of the compression limiter and secured to the tray.

2. The battery assembly as recited in claim 1, wherein the tray is located between a top row of battery arrays that includes the first battery array and the second battery array and a bottom row of battery arrays positioned below the first battery array and the second battery array.

3. The battery assembly as recited in claim 1, wherein the tray is located beneath a bottom row of battery arrays, and the first battery array and the second battery array are part of the bottom row.

4. The battery assembly as recited in claim 1, wherein the compression limiter contacts the first battery array at a location above a top surface of a battery cell of the first battery array.

5. A battery assembly, comprising:
    a tray;
    a first battery array and a second battery array positioned against the tray;
    a compression limiter axially disposed between the first battery array and the second battery array, wherein the compression limiter contacts each of the first battery array and the second battery array; and
    a fastener inserted vertically through a passage of the compression limiter and secured to the tray,
    wherein the compression limiter includes a body and an attachment head, and a flange of the attachment head extends outwardly from the body and contacts each of the first battery array and the second battery array.

6. The battery assembly as recited in claim 1, wherein the compression limiter includes a tapered body extending between a first end and a second end, and an attachment head near the first end of the body and configured to engage a structural member of the battery assembly.

7. The battery assembly as recited in claim 6, wherein the structural member is an extension of a side wall of the first battery array or the second battery array.

8. The battery assembly as recited in claim 7, wherein the extension of the side wall is received within a recess extending between a flange of the attachment head and an arm that extends from the tapered body.

9. The battery assembly as recited in claim 8, wherein the arm extends at a transverse angle toward an underside of the flange.

10. The battery assembly as recited in claim 6, wherein the tapered body is conical-shaped.

11. The battery assembly as recited in claim 6, wherein the tapered body tapers in a direction from the first end toward the second end.

12. The battery assembly as recited in claim 1, wherein an attachment head of the compression limiter engages the first battery array or the second battery array at a location above a top surface of a battery cell of the first battery array or the second battery array.

13. The battery assembly as recited in claim 1, wherein each of the first and second battery arrays include a plurality of battery cells.

14. The battery assembly as recited in claim 1, wherein the compression limiter contacts the tray.

15. The battery assembly as recited in claim 1, wherein the compression limiter includes a tapered body that tapers in a direction extending from a first end toward a second end.

16. The battery assembly as recited in claim 1, wherein the compression limiter includes a body and an attachment head near a first end of the body, and further wherein the attachment head includes a flange and an arm spaced from the flange.

17. The battery assembly as recited in claim 16, comprising a recess formed between the flange and the arm.

18. The battery assembly as recited in claim 17, wherein a portion of a support structure of the first battery array or the second battery array is received within the recess.

\* \* \* \* \*